(12) United States Patent
Chauvin et al.

(10) Patent No.: US 10,350,814 B2
(45) Date of Patent: Jul. 16, 2019

(54) SYSTEM FOR FORMING AND FILLING CONTAINERS WITH CARBONATED PRODUCTS AT AMBIENT TEMPERATURE

(71) Applicant: DISCMA AG, Zurich (CH)

(72) Inventors: Guillaume Chauvin, Monthureux (FR); Damien Kannengiesser, Golbey (FR)

(73) Assignee: Discma AG, Zürich (CH)

( * ) Notice: Subject to any disclaimer, the term of this patent is extended or adjusted under 35 U.S.C. 154(b) by 185 days.

(21) Appl. No.: 15/661,507

(22) Filed: Jul. 27, 2017

(65) Prior Publication Data

US 2017/0320255 A1    Nov. 9, 2017

Related U.S. Application Data

(62) Division of application No. 14/413,637, filed as application No. PCT/EP2013/064148 on Jul. 4, 2013, now Pat. No. 9,724,868.

(30) Foreign Application Priority Data

Jul. 10, 2012 (EP) ..................................... 12175654

(51) Int. Cl.
    *B29C 49/46*    (2006.01)
    *B29C 49/42*    (2006.01)
    (Continued)

(52) U.S. Cl.
    CPC ...... *B29C 49/4268* (2013.01); *B29C 49/4289* (2013.01); *B29C 49/46* (2013.01);
    (Continued)

(58) Field of Classification Search
    CPC ............ B29C 49/46; B29C 2049/4655; B29C 2049/4664
See application file for complete search history.

(56) References Cited

U.S. PATENT DOCUMENTS

| 8,017,064 B2 | 9/2011 | Andison et al. |
| 8,714,963 B2 | 5/2014 | Andison et al. |

(Continued)

FOREIGN PATENT DOCUMENTS

| JP | 2011506130 | 3/2011 |
| WO | 2005/044540 | 5/2005 |
| WO | 2009/075791 | 6/2009 |

OTHER PUBLICATIONS

"Boyle's Law." National Aeronautics and Space Administration. Feb. 1, 2008. <https://www.grc.nasa.gov/www/-12/airplan/boyle.html>. Accessed Sep. 30, 2016.

(Continued)

*Primary Examiner* — Robert B Davis
(74) *Attorney, Agent, or Firm* — Eric J. Sosenko; Jonathan P. O'Brien; Honigman LLP

(57) ABSTRACT

A system for simultaneously forming and filling a container from a thermoplastic polymer preform with a carbonated liquid at ambient temperature. The system includes a mold that encloses the thermoplastic polymer perform, a stretching member that stretches the thermoplastic polymer preform, an injection head that inject the carbonated liquid, and a pressurization system. The pressurization system is configured to, with the carbonated liquid beverage at room temperature (68° F. to 77° F.), increase pressure of the carbonated liquid beverage to a pre-load pressure that is greater than the defined partial pressure of dissolved carbon dioxide in the resultant filled and sealed container at room temperature, to maintain the carbonated liquid beverage at rest and at the pre-load pressure prior to injecting into the preform.

5 Claims, 4 Drawing Sheets

(51) Int. Cl.
*B65B 3/04* (2006.01)
*B65B 7/28* (2006.01)
*B29C 49/78* (2006.01)
*B65B 3/02* (2006.01)
*B29L 31/00* (2006.01)

(52) U.S. Cl.
CPC ............ *B29C 49/783* (2013.01); *B65B 3/022* (2013.01); *B65B 3/04* (2013.01); *B65B 7/28* (2013.01); *B29C 2049/4664* (2013.01); *B29L 2031/7158* (2013.01)

(56) References Cited

U.S. PATENT DOCUMENTS

| | | |
|---|---|---|
| 8,858,214 B2 | 10/2014 | Andison et al. |
| 2009/0218733 A1 | 9/2009 | Andison et al. |
| 2010/0225031 A1 | 9/2010 | Andison et al. |
| 2010/0260914 A1 | 10/2010 | Seta et al. |
| 2011/0031659 A1 | 2/2011 | Warner et al. |
| 2011/0300249 A1 | 12/2011 | Andison et al. |
| 2014/0305081 A1* | 10/2014 | Chauvin ................. B29C 49/10 53/453 |

OTHER PUBLICATIONS

International Search Report for PCT/EP2013/064148 (in English), dated Nov. 13, 2013; ISA/EP.

\* cited by examiner

SYSTEM FOR FORMING AND FILLING CONTAINERS WITH CARBONATED PRODUCTS AT AMBIENT TEMPERATURE

CROSS REFERENCE TO RELATED APPLICATION

This application is a divisional application of U.S. application Ser. No. 14/413,637, filed Jan. 8, 2015, which is hereby incorporated by reference in it's entirely.

FIELD OF THE INVENTION

The invention relates to a system for forming and filling containers from thermoplastic polymer preforms with carbonated liquid products at ambient temperature.

BACKGROUND

Plastic containers such as bottles for liquid beverages are manufactured and filled according to different methods including blow molding or stretch-blow molding.

According to known methods a plastic preform is first manufactured through a molding process and then heated before being positioned inside a blowing mold.

The preform usually takes the form of a cylindrical tube closed at its bottom end and open at its opposite end.

Once the preform has been positioned within the mold only the open end of the preform is visible from above the mold.

The methods make use of a stretch rod, which is downwardly engaged into the open end of the preform so as to abut against the closed bottom end thereof. The stretch rod is further actuated to be urged against the closed end, thereby resulting in stretching down the preform.

According to one known method, after the stretching phase has been initiated, the preform is blown with pressurized air in order to form the container, and after a cooling period, the container can be filled with a liquid product.

When the beverage is a carbonated liquid, it is necessary to reduce the foaming tendency of the product, but also to keep the carbonation properties of the carbonated liquid beverage once filled in the container. A known solution is to cool the carbonated product to a temperature between 10 to 17° C. before filling it in the container. This cooling step increases the manufacturing time and causes high energy consumption, especially in areas with high temperature climate conditions.

According to another manufacturing method, after the stretching phase has been initiated, a liquid is injected into the preform through its open end. This is disclosed, for instance, in Applicant's own patent EP 1 529 620 B1. This liquid injection causes expansion of the preform until coming into contact with the inner walls of the mold, thereby achieving the final shape of the container. The injected liquid is preferably the liquid the container is to be filled with. In case of a carbonated product, the foaming tendency of these products during filling of the container has to be managed.

With the above method, cooling of the carbonated liquid product is not a solution because of the impact of the temperature of the cooled carbonated liquid on the expansion of the preform and because of important energy consumptions.

There is, therefore, a need for a method and a system enabling simultaneous forming and filling of a container with a carbonated liquid, while avoiding foaming of the carbonated liquid and keeping the required carbonation properties of the carbonated liquid.

SUMMARY OF THE INVENTION

With the foregoing in mind, Applicant has discovered that having the carbonated liquid at ambient temperature and at a predetermined pressure prior to its injection in the preform is novel and inventive and is a part of the solution to the above-mentioned problem.

In this respect, disclosed herein is a system and method in which, prior to starting of the injection phase, the carbonated liquid is maintained at a predetermined pressure equal to or above the partial pressure of the carbon dioxide ($CO_2$) defined for the carbonated liquid beverage in the resultant container.

More particularly, prior to starting the injection phase, the system and method comprise bringing the carbonated liquid to a predetermined pressure equal to or above the partial pressure of the carbon dioxide ($CO_2$) defined for the carbonated liquid beverage in the resultant container, so that the thus pressurized or pre-loaded carbonated liquid is ready to be injected.

Advantageously, starting the injection with a carbonated liquid at rest that is already under a predetermined pressure equal to or above the pressure the partial pressure of the carbon dioxide ($CO_2$) defined for said carbonated liquid beverage in the resultant container and at ambient temperature (or room temperature) enables fast filling and expansion of the preform.

Furthermore, since the carbonated liquid beverage is at ambient temperature without any cooling, the preform remains at a sufficiently high temperature allowing for fast expansion of the preform without damage.

The chosen pressure also allows keeping all the carbonated properties of the carbonated product. This means that during the process of forming and filling the container, the carbonated product keeps its concentration of carbon dioxide and that the carbonated product at the end of the process presents the required carbonation properties.

The predetermined pressure to be reached by the liquid is defined by the partial pressure of the carbon dioxide for the specific carbonated beverage to be filled in the container. Each carbonated beverage has specific carbonation properties leading to define different partial pressure of the carbonated dioxide of the carbonated beverage in the container.

The predetermined pressure to be reached by the carbonated liquid is defined to be equal or greater that the above mentioned partial pressure.

According to a possible feature, the predetermined pressure is less than or equal to 40 bars.

According to another possible feature, the predetermined pressure is less than or equal to 15 bars when the thermoplastic polymer is PET.

The value of the predetermined pressure may be adjusted through trials and experiments within reach for the skilled person so as to avoid breaking the preform during the injection and to keep the required properties of the carbonated beverage.

According to a possible feature, the method comprises opening a valve device in a liquid injection circuit so as to release the pressurized carbonated liquid in the circuit and enable its injection into the preform, the pressurized carbonated liquid being at said predetermined pressure upstream of said valve device before its opening.

Thus, the liquid, e.g., at rest, that is to be injected is already pressurized before the injection phase has started and the liquid has been put into circulation within the liquid injection circuit.

According to another possible feature, the method further comprises venting the container to atmospheric pressure once the container is blown and filled with the carbonated liquid, allowing capping of the container.

The container can be capped with different closing means such as cap, seal, or else.

It is to be noted that the whole manufacturing process simplifies considerably the process of producing containers filled with carbonated beverages as the process does not requires complicated or costly steps.

This system has the same advantages as those mentioned above in connection with the method. It is also a part of the solution to the above-mentioned problem.

According to a possible feature, the system comprises means for bringing the liquid to said predetermined pressure equal or above the partial pressure of the carbon dioxide ($CO_2$) defined for the carbonated liquid beverage in the resultant container.

According to a more specific feature, the means for bringing the liquid to the predetermined pressure above the atmospheric pressure comprise at least one of the following: a piston/cylinder device, a pump device, or a similar device performing the same function.

Each of these pressurizing devices may be connected upstream of the injection means.

According to a possible feature, the devices for bringing the liquid to the predetermined pressure comprise a piston/cylinder device, a pump device or a piston device connected thereto.

These devices are suitable for cooperatively operating so as to efficiently inject the carbonated liquid under pressure into the preform. Three different operating ways may be envisaged.

Firstly, the pump device provides the carbonated liquid and takes care of the carbonated liquid pressure prior to and during the forming (the injection phase) of the container. The role of the piston device is to provide the pressure of carbonated liquid at the end of the forming process, in particular, for ensuring appropriate printing of the details on the outside surface of the container.

Secondly, in an alternative operating way, the pump device provides the carbonated liquid to fill the piston device and the latter takes care of everything: building up the liquid pressure prior to forming the container and providing the pressure during and after the filling of the container.

Thirdly, as another alternative operating way, the system does not integrate any pump device. In a first step the piston device is used to bring and/or keep the carbonated liquid at the predetermined pressure and to transfer the volume of the carbonated liquid in the preform during the injection phase. In a second step the piston provides the pressure of carbonated liquid at the end of the forming process, in particular, for ensuring appropriate printing of the details on the outside surface of the container.

According to a possible feature, the system comprises means for storing energy produced when bringing the liquid to the predetermined pressure above the atmospheric pressure.

As mentioned, the predetermined pressure of the carbonated liquid prior to injection is less than or equal to 40 bars, more preferably, less than or equal to 15 bars when the container is made of PET thermoplastic polymer.

According to another possible feature, the system comprises: a liquid injection circuit for injecting the carbonated liquid into the 25 preform, a valve device (or a similar device performing the same function) that is located upstream of the carbonated liquid injection circuit, the valve device enabling holding of the liquid at the predetermined pressure equal or above the partial pressure of the carbon dioxide ($CO_2$) defined for the carbonated liquid beverage in the container and ready to be injected when closed, and, release of the pressurized liquid in the liquid injection circuit for injection into the preform when open.

The liquid at rest is under a predetermined pressure upstream of the valve device.

Thus, even after opening the valve device the pressure of the carbonated liquid circulating in the liquid injection circuit will remain at a sufficiently high value when being introduced into the preform despite of the decrease in pressure at the opening of the valve device.

The invention will now be described in view of the appended figures presenting non-restricted embodiments of the present invention.

DETAILED DESCRIPTION

Figure 1:
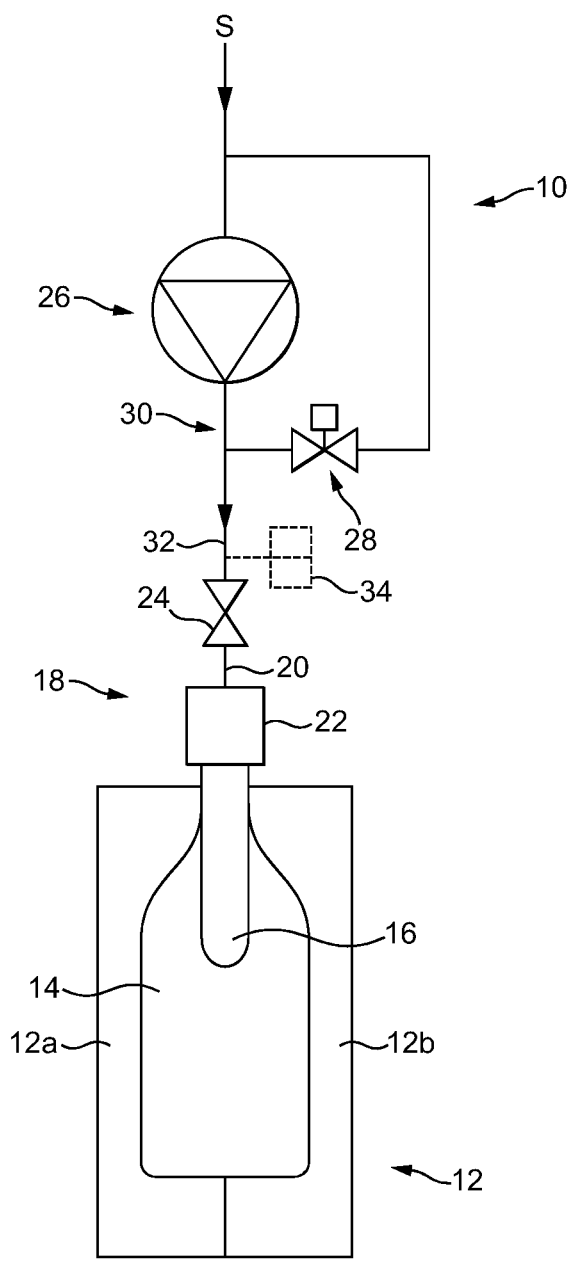
FIG. 1 schematically represents a system for forming and filling containers according to a first embodiment incorporating the principles of the invention.

FIG. 1 schematically represents a system 10 for simultaneously forming and filling thermoplastic polymer containers such as bottles, from thermoplastic polymer preforms, with a carbonated beverage according to the invention.

The system is intended for simultaneously forming and filling container with carbonated liquid at room temperature.

A carbonated beverage is a liquid, which can be water, a water based beverage or else, into which carbon dioxide gas ($CO_2$) under pressure has been dissolved. Examples of carbonated beverages are sparking water, soda, tonic, soft drinks.

In the present case and generally speaking the most common liquid used for carbonated beverage is water based liquid.

In a carbonated beverage, carbon dioxide is dissolved in a liquid. Its solubility in the liquid depends on temperature, partial pressure of the carbon dioxide over the liquid, nature of the liquid, and nature of the gas (here carbon dioxide).

Carbonated beverages are an example of Henry's law in everyday life. The dissolved carbon dioxide stays in solution in a closed container where the partial pressure of the carbon dioxide was set at a high value during filling. When the container is opened, the partial pressure of the carbon dioxide is much lower and the dissolved carbon dioxide will gradually escape from the liquid.

It is essential that the present system allows keeping the carbonation properties of the carbonated liquid during forming and filling of the container in order to avoid having in the end a "flat" product in the closed container.

The complete process and the system work at room temperature. By room temperature it is intended, between 13 and 35° C. and most preferably between 20 and 25° C. as it depends on the geographical location of the production unit using the claimed system.

Referring to FIG. 1, system 10 comprises a mold 12 for enclosing a thermoplastic polymer preform. Generally the preform 16 is made of semi-crystalline PET (polyethylene terephthalate).

Mold 12 is for example a two-part mold of which the two parts 12a, 12b define an inner cavity 14 when assembled together.

As represented in FIG. 1, a thermoplastic polymer preform 16 is inserted into cavity 14 at the beginning of the forming and filling process or just before. The shape of the cavity corresponds to the shape of the achieved container and it will be wholly occupied by the formed container at the end of the forming and filling process.

In the present embodiment, the container which is being blown and filled is a bottle to be filled with a carbonated liquid. It is to be noted that mold 12 may alternatively be composed of more than two parts depending on the manufacturing process and on the shape of the container to be made.

For instance, a third part may be added at the bottom of the mold so as to constitute at least a part of the inner cavity bottom.

System 10 further comprises a liquid injection circuit 18 disposed above the mold.

Liquid injection circuit 18 comprises a duct 20 and injection means 22 downstream of duct 20.

Injection means 22 may be an injection head which comes into a sealing contact (for liquid tightness purpose) with preform 16.

The injection head includes an injection nozzle (not represented in the drawing) that is moveable between an injection position allowing liquid to be injected into the preform and a rest position in which the injection nozzle rests against an inner surface of the injection head in a sealing engagement so as to prevent any flow of liquid from the injection head into the preform.

System 10 also comprises stretching means for stretching preform 16 enclosed within mold 12. Stretching means comprise a stretching rod which is in a sliding connection with the injection nozzle.

In FIG. 1, the stretching rod is not represented for the sake of clarity. Stretching means will be illustrated in FIG. 4 which will be subsequently described. The stretching rod of FIG. 1 embodiment is actuated upon command to be inserted into preform 16 so as to stretch the latter while a filling liquid is injected thereinto with a view to causing expansion of said preform within the mold.

Actuating means for actuating the rod have not been represented either for the sake of clarity. System 10 comprises a valve device 24 that enables flowing of the carbonated liquid through circuit 18 when opened and prevents carbonated liquid from flowing through the valve device and downstream thereof when closed.

The carbonated liquid to be injected into the preform is supplied from a source of liquid S which feeds said liquid to a pump device 26 of system 10. Pump device 26 is located upstream of valve device 24.

As represented in FIG. 1, a flow valve 28 is mounted in parallel with pump device 26, as a safety valve. This valve acts as a discharge valve in order to protect the pump device, for instance when the liquid pressure is building up or if there is no bottle being 30 manufactured.

System 10 also comprises a liquid circuit 30 located upstream valve device 24 and that is a liquid supply circuit including pump device 26 and flow valve 28. Liquid circuit 30 further includes a duct or pipe 32 located between pump device 26 and valve device 24 and connected to the latter.

In the present embodiment, duct or pipe 32 is flexible in that it is elastically deformable. In the course of performing the forming and filling method according to the invention, the stretching means is actuated during a stretching phase whereas valve device 24 is in a closed position, thereby preventing the carbonated liquid from being injected into preform 16. The carbonated liquid, which is at room temperature, is brought to a predetermined pressure P1 by the pump device 26. This predetermined pressure P1 can be seen as pre-load in the liquid circuit upstream of liquid injection circuit 18 and valve device 24. According to the invention and in order to keep the required carbonation properties of the carbonated liquid once filled in the container, the predetermined pressure P1 is equal or greater to the partial pressure P2 of the carbon dioxide ($CO_2$) defined for said carbonated product in the container.

Figure 2:
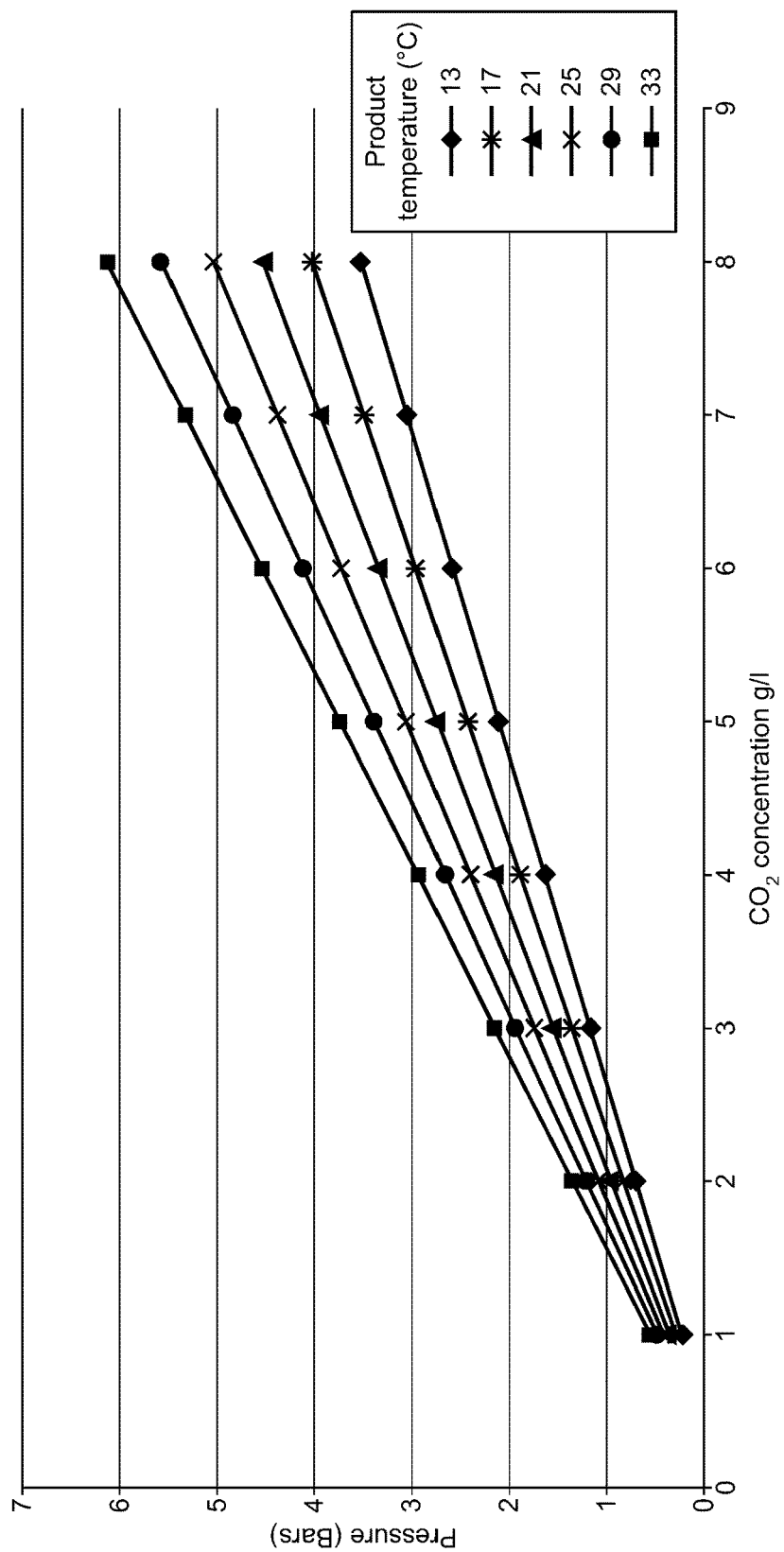
FIG. 2 represents a diagram showing the partial pressure of carbon dioxide ($CO_2$) of the carbonated liquid in a container for a given concentration of carbon dioxide ($CO_2$) and a given ambient temperature.

In the present case, where the container is made of PET thermoplastic polymer, the predetermined pressure P1 is less than or equal to 40 bars, more preferably less than or equal to 15 bars. FIG. 2 presents the partial pressure P2 of the carbon dioxide ($CO_2$) in the container for a carbonated product having a given carbon dioxide concentration (in gram per litre), at a given temperature.

As claimed in the process, the predetermined pressure P1 to be applied on the carbonated liquid prior to its injection in the preform, is equal or greater than the partial pressure P2 of the carbon dioxide ($CO_2$) defined for said carbonated product in the container. Said diagram gives then the inferior limit for the predetermined pressure P1 to be applied to the carbonated liquid prior to its injection in the preform in order to get the requested carbon dioxide ($CO_2$) partial pressure in the end product in the container. As can be seen from FIG. 2, the temperature plays an important role in determining the value of the predetermined pressure P1 to be applied.

The predetermined pressure value P1 can then be precisely determined according to the value of the ambient temperature and the carbon dioxide concentration defined for a given carbonated liquid.

Thus, coming back to system 10, the carbonated liquid that is at rest upstream of valve device 24 before the injection phase starts is already "pre-loaded" at the above-mentioned predetermined pressure P1.

After a predetermined period of time after the stretching phase has started, an injection phase starts for injecting the carbonated liquid into the preform. The injection phase starts with the opening of valve device 24. Actuation of valve device 24 may be controlled through a processor or a computer or may be manual.

When the carbonated liquid at rest and under predetermined pressure P1 in the injection circuit 18 is released through the opening of valve device 24, at the start of the injection phase, it flows into duct 20, injection means 22 (injection nozzle is actuated to occupy the injected position) and preform 16.

This speeds up the injection phase in that the carbonated liquid is more quickly introduced into the preform 16 which is simultaneously being stretched.

This faster injection of the carbonated liquid during the stretching phase enables better control of the expansion of the preform and avoids breakage thereof. The fact that the carbonated liquid is at room temperature during injection also allows the preform to remain at a sufficiently high temperature which facilitates a fast expansion of the preform and avoids damages in the formation of the container. As seen, the carbonated liquid is injected under pressure while forming the container. The carbonated liquid is maintained under pressure in the container until venting of the opening of the container to atmospheric pressure. The fact that the carbonated liquid is kept under pressure avoids foaming during filling of the container.

Shortly after venting has been made the opening of the container is closed with a cap, a seal or other closing means. Today, venting to atmospheric pressure is currently being performed by opening a communication channel between the opening of the container and the ambient atmospheric pressure. In the field of container blowing this process is referred to as a degasification process.

In the present invention, any degasification process could be used.

Due to the fact that during forming of the container the carbonated liquid is maintained under pressure in the container and due to controlled degasification, the foaming tendency of the carbonated liquid during filling of the container or during venting is controlled. The method of simultaneously forming and filling a plurality of thermoplastic polymer containers according to the invention is implemented through system 10.

Figure 3:
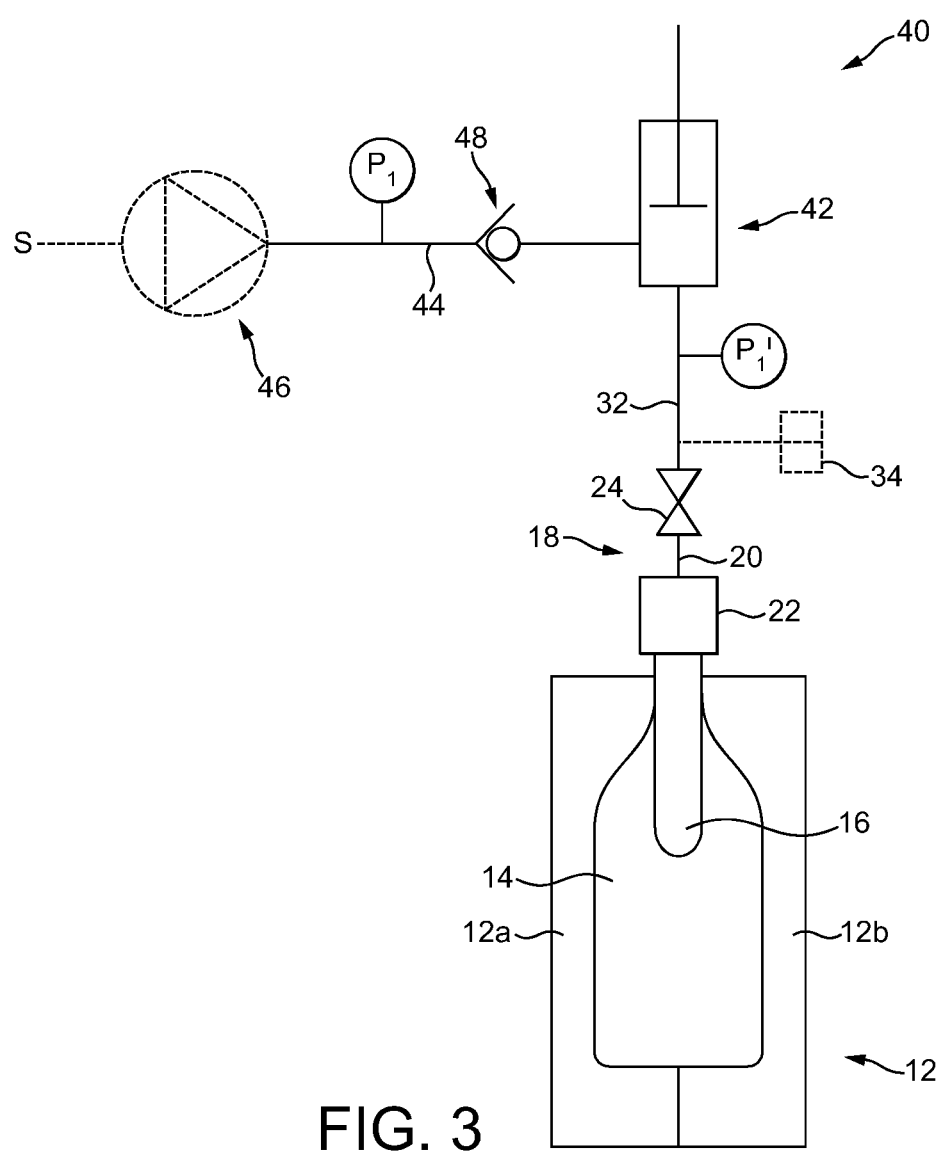
FIG. 3 schematically represents a system for forming and filling containers according to a second embodiment incorporating the principles of the invention.

FIG. 3 illustrates a second embodiment of a system 40 for forming and filling thermoplastic containers according to the invention. As has been already described with reference to FIG. 1, system 40 comprises a mold 12, here a two parts mold 12a and 12b, for enclosing preform 16 and an injection liquid circuit 18 for injecting liquid into the preform.

Liquid injection circuit 18 comprises a duct 20 and injection means 22 downstream of duct 20. Valve device 24 is located upstream of circuit 18.

System 40 further comprises upstream of valve device 24 a piston device 42 which is able to pressurize a liquid supplied by a source S through a supply line 44 connected to piston device 42 upstream thereof. Supply line 44 also includes a non-return valve 48 so as to prevent any return of liquid from piston device 42 to liquid source S.

As represented in FIG. 3, liquid is supplied under a predetermined pressure P1 to piston device 42. Pressure P1 is the predetermined pressure equal or greater than the partial pressure P2 of the carbon dioxide ($CO_2$) defined for the specific carbonated liquid beverage in the container.

Piston device 42 makes it possible to maintain the liquid at the predetermined pressure P1 above the atmospheric pressure while the liquid is at rest upstream of valve device 24. At a certain time, valve device 24 is commanded to be opened so as to release the liquid accumulated upstream of said valve device.

The injection phase therefore starts and liquid flows through liquid injection circuit 18 and into preform 16 for filling thereof.

As for the FIG. 1, first embodiment, stretching means which are simultaneously stretching preform 16 are not represented in FIG. 3 for the sake of clarity.

The piston device 42 is further actuated to exert a further pressure on the carbonated liquid so as to increase its pressure during the injection phase as represented by the peak in pressure. This increase in pressure takes place within an interval of time during which piston device 42 further pushes the liquid into the preform.

This increase in pressure makes it possible to ensure that the formed container will perfectly spouse the inner walls of mold cavity 14. This will make it possible to obtain a container with detailed relief and finished surface such as corrugations, etc.

Due to piston device action, the predetermined pressure P1 is increased to pressure P'1. Pressure P'1 is then at least equal or greater than the predetermined pressure P1 and so at least equal or greater than P2, partial pressure of the carbon dioxide ($CO_2$) defined for the specific carbonated liquid beverage in the container. As represented in dotted lines in FIG. 3, system 40 may further comprise a pump device 46 that is similar to pump device 26 of FIG. 1.

Pump device 46 behaves as pump device 26 and supplies pressurized liquid coming from a source of liquid S to supply line 44 and piston device 42 connected thereto. It is to be noted that any kind of device which is able to displace a predetermined volume of liquid, such as water, may be used for pre-loading the liquid circuit upstream of valve device 24. A deformable duct 32 and an expansion tank 34 connected to duct 32 are also presented for the purpose of storing energy produced through pressurizing of the carbonated liquid.

As discussed in relation to FIG. 3, the system 40 can work with or without pump device 46 (in dotted lines). If system 40 is not provided with a pump device 46, the piston device is used, to keep the carbonated liquid at the predetermined pressure or bring it at a higher pressure P'1 than the predetermined pressure P1 and tin the first step of the process to transfer the volume of the carbonated liquid in the preform during the injection phase. In a second step of the process the piston provides the pressure of carbonated liquid at the end of the forming process, in particular, for ensuring appropriate printing of the details on the outside surface of the container.

In this embodiment, the carbonated liquid is brought to the piston device by alternative means other than a pump device. If system 40 is provided with a pump device 46, the pump device 46 provides the carbonated liquid to fill the piston device 42 and the latter takes care of building up the liquid pressure prior to forming the container and providing the pressure during and after the filling of the container.

Figure 4:
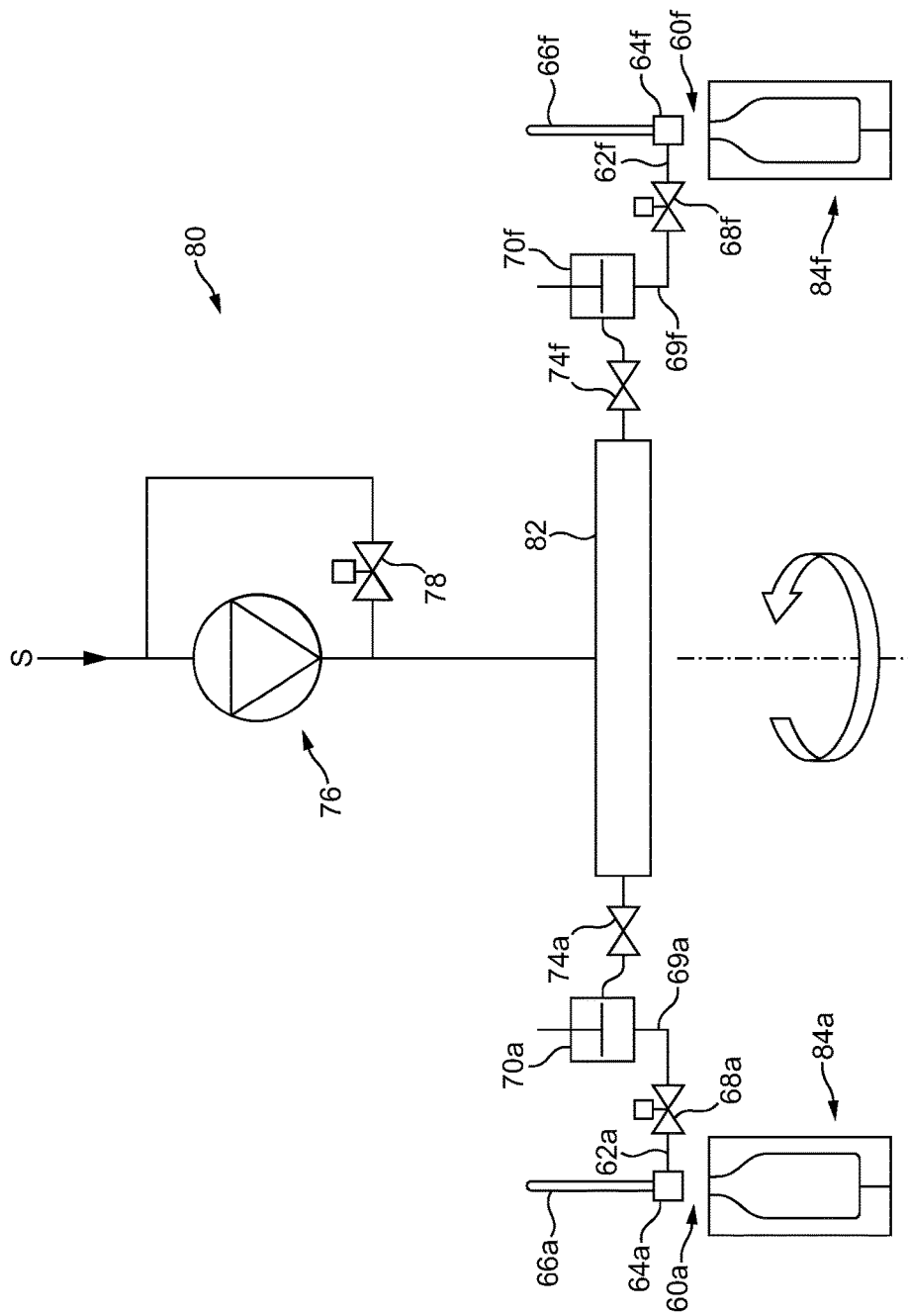
FIG. 4 schematically represents a system for forming and filling containers according to a third embodiment incorporating the principles of the invention.

FIG. 4 illustrates a third embodiment of a system 80 for forming and filling a plurality of thermoplastic polymer containers according to the invention. System 80 of FIG. 4 differs from system 10 and 40 of FIGS. 1 and 3 in that it comprises a rotating manifold 82 allowing to blow and fill several containers at the same time.

The rotating stations are disposed in a peripheral manner around manifold 82. Thus, each station has a liquid injection circuit or unit 60a-f located above a mold 84a that is identical to mold 12 in FIGS. 1 and 3.

As represented in FIG. 4, the liquid injection circuit and the associated stretching means are located above the molds and the enclosed preforms. Each preform is identical to preform 16 of FIGS. 1 and 3.

The station further includes a plurality of liquid injection circuits 60a-f each comprising a duct 62a-f and injection means 64a-f (injection head) and stretching means (stretch rod) 66a-f are connected to injection means 64a-f so as to cooperate therewith during the simultaneous forming and filling process. Stretching means represented under the form of a stretch rod 66a-f cooperate each with each injection means 64a-f in a known manner during the simultaneous forming and filling process.

As represented in FIG. 4, the liquid injection circuit and the associated stretching means are located above the molds and the enclosed preforms. Each preform is identical to preform 16 of FIGS. 1 and 2.

The station further comprises a valve device 68a-f upstream of liquid injection circuit 60a-f. These valve devices are controlled to be opened or closed in accordance with a given step or phase of the process.

The station also comprises a piston device 70a-f located upstream of valve device 68a-f as well as an associated upstream valve 74a-f which is located downstream of a corresponding manifold outlet. This piston device 70a-f perform each the same function as that of piston device 42 in FIG. 3 and are connected to valve device 68a-f through duct or pipe 69a-f. These valves 74a-f are for instance proportional valves which allow the flow of liquid to be accurately controlled.

The whole connection between each station and the manifold rotates together with these components. More particularly, manifold 72 comprises several outlets connected downstream to the respective valves 74a-f and a common inlet that is connected upstream to a pump device 76. Pump device 76 is the same as pump device 26 of FIG. 1 and pump device 46 of FIG. 3.

Pump device 76 and its possible associated safety valve 78 are located upstream of manifold 82 and connected thereto through a manifold inlet. Safety valve 78 has the same role as valve 28 in FIG. 1.

As represented in FIG. 4, pump device 76 is located above manifold 82, but other alternative arrangements may be envisaged according to different constraints, such as the space available for the system etc. Pump device 76 may be in a fixed position or may rotate together with manifold 82. Pump device 76 may be centrally located so as to provide a more compact design for the whole system.

The combination of pump device 76 and the plurality of piston devices 70a-f make it possible to simultaneously blow and fill a plurality of thermoplastic polymer containers, e.g. containers, according to the invention. Both types of devices operate in the same way as that described with reference to FIG. 3. This arrangement is easy to conceive since the pump device is centered on the rotating axis of the system.

Rotating manifold 82 is connected to a plurality of rotating stations through several peripheral outlets.

The carbonated liquid to be injected into each preform (not represented) placed within a corresponding mold of the plurality of stations is supplied from a source of liquid S and pressurized at predetermined pressure P1 through pump device 76 which supplies pressurized liquid to rotating manifold 82.

The method of simultaneously forming and filling a plurality of thermoplastic polymer containers according to the invention is implemented through system 80. The method is the same as that already described with reference to the previous Figures.

In particular, the arrangements of system 80 make it possible to pre-load the circuits upstream of closed valve devices 68a-f so that the liquid at rest that is located upstream of these valve devices is already pressurized to a predetermined pressure equal or greater than the partial pressure (P2) of the carbon dioxide ($CO_2$) defined for said carbonated liquid beverage in the container.

The exact configuration and operation of the invention as practiced may thus vary from the foregoing description without departing from the inventive principle described therein. Accordingly the scope to this disclosure is intended to be exemplary rather than limiting, and the scope of this invention is defined by any claims that stem at least in part from the foregoing disclosure.

The invention claimed is:

1. A system for simultaneously forming and filling a container from a thermoplastic polymer preform using a carbonated liquid beverage as the forming medium, the carbonated liquid beverage of a resultant filled and sealed container having a defined partial pressure of dissolved carbon dioxide, the system comprising:
    a mold configured to encloses the thermoplastic polymer preform;
    a stretching member configured to stretch the thermoplastic polymer preform within the mold;
    an injection head configured to inject the carbonated liquid into the preform; and
    a pressurization system, the pressurization system being configured to, with the carbonated liquid beverage at room temperature (68° F. to 77° F.), increase pressure of the carbonated liquid beverage to a pre-load pressure that is greater than the defined partial pressure of dissolved carbon dioxide in the resultant filled and sealed container at room temperature, to maintain the carbonated liquid beverage at rest and at the pre-load pressure prior to injecting of the carbonated liquid beverage into the preform, and, with the carbonated liquid beverage at rest and at the pre-load pressure and after stretching by the stretching member has started, to initiate and continuing injection of the carbonated liquid beverage into the preform to form the container.

2. The system according to claim 1, wherein the pressurization system includes one of a piston/cylinder device and a pump device configured to bring the carbonated liquid beverage to the pre-load pressure.

3. The system according to claim 1, wherein the pre-load pressure is less than or equal to 40 bars and the container is of PET thermoplastic polymer.

4. The system according to claim 1, wherein the injection head includes a liquid injection circuit configured to inject the carbonated liquid beverage into the preform.

5. The system according to claim 4, further comprising a valve located upstream of the liquid injection circuit, the valve configured to enable holding of the carbonated liquid beverage at the pre-load pressure and ready to be injected when closed, and, to release of the pressurized liquid in the liquid injection circuit for injection into the preform when open.

* * * * *